3,167,569
6,16-DIALKYL-21-FLUORO PREGNANES AND THE PROCESS FOR THE PRODUCTION THEREOF
Robert P. Graber, Minneapolis, Minn., and Martin B. Meyers, Glasgow, Scotland, assignors to General Mills, Inc., a corporation of Delaware
No Drawing. Filed Mar. 1, 1962, Ser. No. 176,780
10 Claims. (Cl. 260—397.47)

This invention relates to 6,16α-dialkyl-17α-oxygenated-21-fluoroprogesterones, methods of preparing same and novel intermediates in the process of preparation.

The 6,16α-dialkyl-17α-oxygenated-21-fluoroprogesterones are members of the steroid class of sex hormones, which includes progesterone. As with progesterone, the compounds are of value for the prevention of habitual or threatened abortion, the treatment of dysmenorrhea, premenstrual tension, as ovulation suppressing agents and other sex cyclic regulatory purposes. As ovulation-suppressing agents, such compounds find utility for the breeding of animals such as livestock, dogs, rabbits and the like.

Thus, the compounds of this invention are highly active progestational hormones. In addition, the products are valuable intermediates to research chemists for the preparation of other steroids such as the anti-inflammatory corticoid hormones, for example, by the introduction of oxygen into position 11 of the molecule by fermentation with certain known microorganisms to provide a 11-hydroxy compound in which the 11-hydroxy group may be further oxidized chemically to a ketone group.

Briefly, the invention provides a method of converting a compound such as a 6β,16α-dialkylpregnane-3β,5α,17α-triol-20-one 5-acylate to the 6,16α-dialkyl-17α-hydroxy-21-fluoroprogesterones and the 17-acylates thereof. The final products may further be converted to the $\Delta^1$, $\Delta^6$, $\Delta^{1,6}$-dehydro derivatives. The 6β,16α-dialkylpregnane-3β,5α,17α-triol-20-one 5-acylates may be prepared from known starting materials such as the 5α,6α-oxido-16-pregnene-3β-ol-20-one 3-acylates. The invention can best be followed by means of the following schematic representation. Reaction Sequence A illustrates the preparation of the 6α,16α-dialkyl-17α-hydroxy-21-fluoroprogesterones from the 6β,16α-dialkylpregnane-3β,5α,17α-triol-20-one 5-acylates. Reaction Sequence B illustrates the conversion of the products of Reaction Sequence A to the corresponding 17-acylates and to the $\Delta^1$, $\Delta^6$ and $\Delta^{1,6}$-dehydro-derivatives of the progesterone products or the 17-acylates thereof.

In the following schematic representation, R is hydrogen or an acyl group and R' is an alkyl group having from 1 to 8 carbon atoms. The acyl groups may be widely varied. As to the acylate groups in the 3 and 5 positions in the intermediate compounds, any acylate may be employed as it is apparent from the schematic representation that the acylate groups in these positions are not carried along in the final product. In addition, the particular acylate groups in these positions do not have any bearing on the activity of the compound. As the nature of the acylate groups in these positions is not critical, the acylate groups in these positions will generally take the form $$R'''\underset{\underset{O}{\|}}{C}-$$

where R''' is an alkyl group having from 1 to 12 carbon atoms and as a practical matter the acetate ester is generally employed. As the activity of the compound generally varies dependent on the acylate group in the 17 position, the acylate group may be varied widely, as indicated by the groups set forth below, to provide the activity desired. Such acyl groups will take the form $$R''\underset{\underset{O}{\|}}{C}-$$

in which R'' is an alkyl, cycloalkyl, aralkyl or alkoxyaralkyl group, the alkyl group generally having from 1 to 12 carbon atoms and the aryl group generally being phenyl. Illustrative of such ester groups are the acetate, propionate, caproate, cyclopentyl propionates, phenyl propionates, p-propoxyphenyl propionate, p-hexoxyphenyl propionate and p-dodecoxyphenyl propionate.

REACTION SEQUENCE A

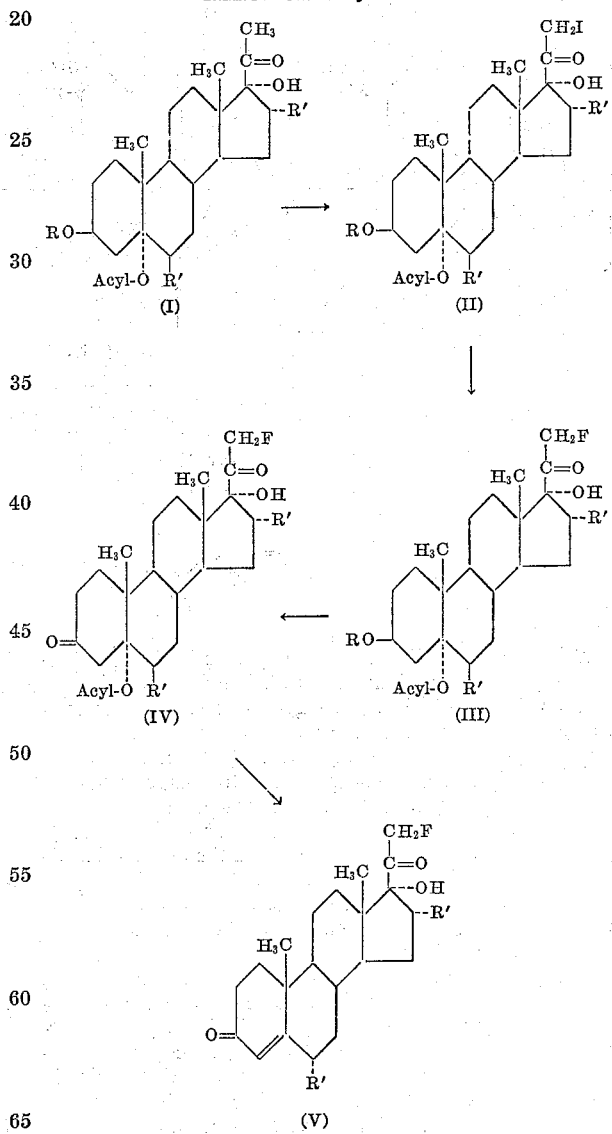

REACTION SEQUENCE B

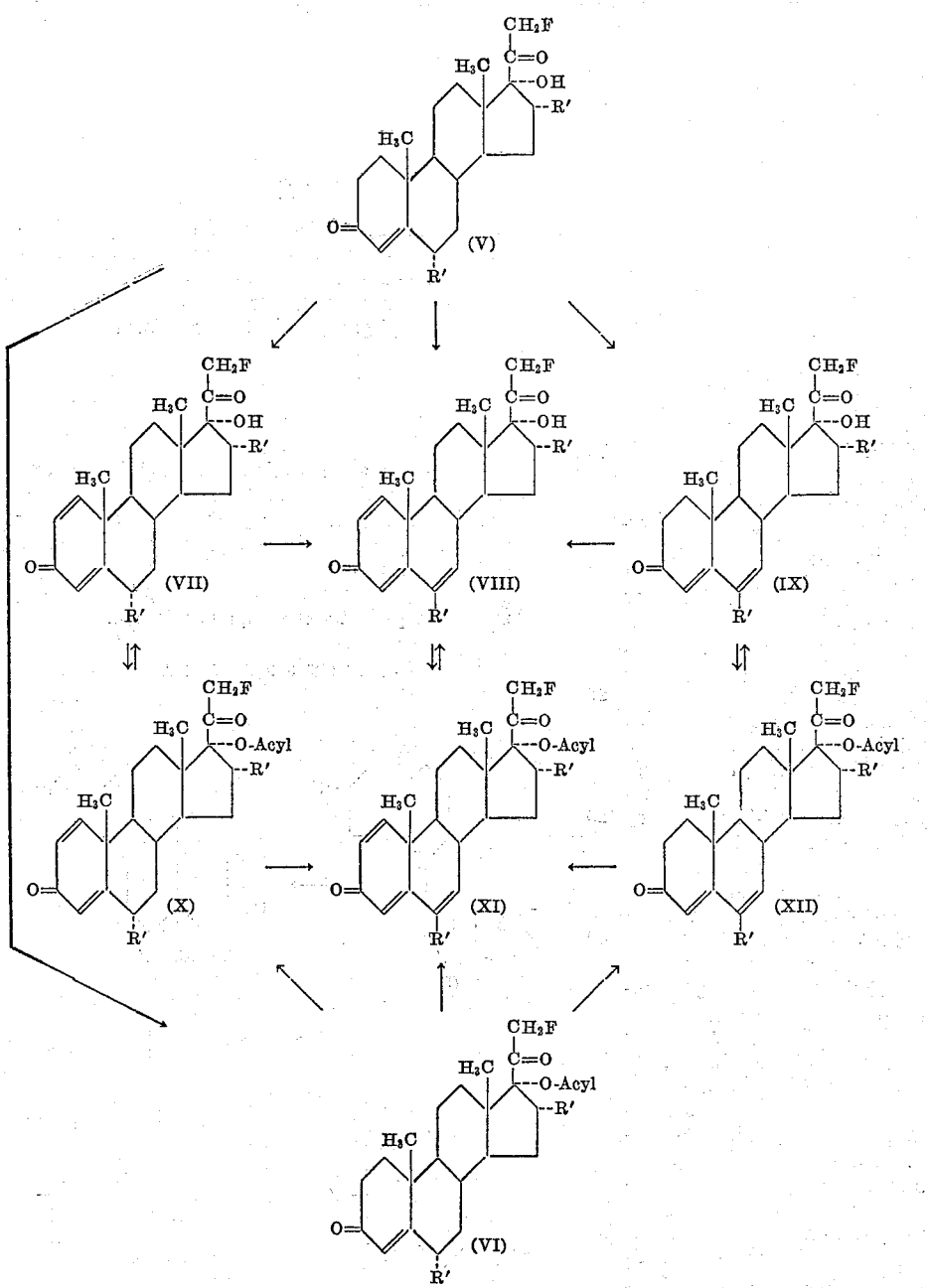

Briefly, as seen in Reaction Sequence A, the dialkyltriolone (I) may be iodinated with iodine to provide the 21-iodo derivative (II). The 21-iodo compound is then treated with a source of fluoride ions to produce the corresponding 21-fluoro analog (III). Oxidation of (III), where R is H, then provides the 3-keto compound (IV), which, on treatment with acid undergoes elimination of the 5-acyloxy function and epimerization of the 6β-alkyl group to the 6α-configuration to afford the 6α,16α-dialkyl-17α-hydroxy-21-fluoroprogesterone (V).

As seen in Reaction Sequence B, the 17-hydroxyl function of (V) may be acylated to provide various 17-acyloxy derivatives (VI) which may then be dehydrogenated to provide the $\Delta^1$, $\Delta^{1,6}$ and $\Delta^6$-dehydro derivatives, (X), (XI) and (XII) respectively. The 6α,16α-dialkyl-17α-hydroxy-21-fluoroprogesterone (V) itself may be dehydrogenated to provide the $\Delta^1$, $\Delta^{1,6}$ and $\Delta^6$-dehydro derivatives (VII), (VIII) and (X) respectively which may in turn be acylated to provide (X), (XI) and (XII) respectively. The various 17-acylates may of course be converted to the corresponding 17-hydroxy compounds as indicated.

It is therefore an object of this invention to provide novel highly active progestational agents.

It is also an object of this invention to provide novel 6α,16α - dialkyl - 17α - oxygenated - 21 - fluoroprogesterones.

It is also an object of this invention to provide 6α,16α-dialkyl - 17α - hydroxy - 21 - fluoroprogesterones and the 17-acylates thereof.

It is further an object of this invention to provide a method of preparation of the 6α,16α-dialkyl-17α-oxygenated-21-fluoroprogesterones.

It is also an object of this invention to provide novel intermediates for the preparation of the 6α,16α-dialkyl-17α-oxygenated-21-fluoroprogesterones.

The starting materials employed in this invention, the 6β,16α - dialkylpregnane - 3β,5α,17α - triol - 20 - one 5-acylates, and the corresponding 3-acylates thereof may be prepared in accordance with our copending U.S. application, Serial No. 88,030, filed February 9, 1961. In accordance with said application, the materials may be prepared by treatment of 5α,6α-oxido-16-pregnene-3β-ol-20-one 3-acetate with Grignard reagent such as an alkyl magnesium bromide in the presence of cuprous chloride followed by treatment, without isolation, with an acylating agent such as acetyl chloride to provide a mixture of cis and trans forms of 6β,16α - dialkyl - 17(20)-pregnene-3β,5α,20-triol 3,5,20-triacylate. The product thereof is then epoxidized with a peracid such as perbenzoic acid to provide a mixture of cis and trans forms of 17α,20-oxido-6β,16α-dialkylpregnane-3β,5α,20-triol 3β,5α,20 - triacetate. Alkaline hydrolysis thereof provides the starting material for the present invention, 6β,16α-dialkylpregnane-3β,5α,17α - triol - 20 - one 5-monoacylate, which may be acylated to the 3,5-diacylate, if desired.

The 5α,6α-oxido material from which the starting materials are prepared may in turn be prepared from known mixtures of the α and β isomers resulting from the epoxidation of unsaturated steroid compounds with a peracid, in this instance, the epoxidation of 16-dehydro-pregnenolone acetate. The α-oriented isomer, which usually predominates, may then be harvested by conventional crystallization procedures or in accordance with our copending U.S. application, Serial No. 59,203, filed September 29, 1960. In accordance with said copending application, the mixture of α and β epoxides may be converted to the α-oxido compound alone by (a) opening the oxirane ring by treatment with perchloric acid in aqueous acetone to produce a single trans diol, one of the hydroxyl groups being a secondary hydroxyl group, (b) regeneration of only the α epoxide by esterification of the secondary hydroxyl group by treatment with methane sulfonyl chloride in pyridine, and (c) elimination of the ester group then formed by treatment with weak alkali such as an aqueous mixture of sodium bicarbonate and pyridine.

For purposes of simplicity of illustration, the process and compounds provided thereby will be discussed in detail below with reference generally to the methyl compounds and the acetate esters but it is hereby understood that this is merely illustrative of the process and products of the present invention and is not to be construed as limiting the invention as the other alkyl groups and esters, as previously pointed out, are also thus provided. Also, unless otherwise indicated, all temperatures are in ° C.

*(1) 21-halogenation of 6β,16α-dialkylpregnane-3β,5α, 17α-triol-20-one 5-acylate or 3,5-diacylate (I)*

Treatment of a tetrahydrofuran-methanol solution of the 5-monoacetate or the 3,5-diacetate containing powdered calcium oxide and azobisisobutyronitrile with a tetrahydrofuran-methanol solution of iodine results in direct iodination at carbon 21 to produce the 21-iodo derivative (II). The iodination of the 3,5-diacetate also results in the loss of the ester function at position 3 so that the same 21-iodo-5 monoacetate results from either starting material.

The reaction is normally carried out in a mixture of tetrahydrofuran and methanol using about equal volumes of each solvent. The calcium oxide is normally employed in an amount ranging from about the weight of steroid compound to twice the weight of steroid. An amount equal to about one and one-half the weight of steroid is preferred. The azobisisobutyronitrile is normally employed in an amount equal to about 5% of the weight of the steroid compound. Somewhat smaller amounts or even larger quantities may be used. The time of reaction depends to some extent on the ratio of azobisisobutyronitrile to steroid. The amount of iodine added is normally about equal to the weight of steroid. In order to initiate the reaction after the addition of a few drops of the iodine solution, we prefer to illuminate the reaction mixture, e.g. from a tungsten filament bulb.

The reaction is normally carried out by adding a few drops of the iodine solution, stirring with illumination until absorption of iodine commences and then adding the remainder of the iodine solution over a period of about one-half to one hour. The reaction is allowed to stir at room temperature for an additional short period, then diluted with a solvent such as ether and filtered to remove the calcium oxide and other insoluble materials. The filtrate is washed free of iodine and other water soluble materials, dried and evaporated to afford the 21-iodo product (II) as an amorphous solid, readily identified by its characteristic infrared spectra.

The 5-monoacetate or the 3,5-diacetate may also be directly brominated at carbon 21 to give the corresponding 21-bromo derivatives. This reaction is normally carried out by treatment of a chloroform or methylene chloride solution of the steroid with a solution of bromine in the corresponding solvent. The reaction may be carried out at temperatures ranging from 0 to 50° C. but we prefer temperatures of about 25–45° C.

The reaction mixture is worked up substantially as described for the 21-iodination to give the crude 21-bromo derivatives. These 21-bromo compounds may then be converted to the corresponding 21-iodo compounds by treatment with a solution of sodium iodide in acetone under reflux. The 21-iodinated products are recovered by dilution with water, concentration in vacuo to remove the acetone followed by filtration or extraction with ethyl acetate, methylene chloride or the like.

*(2) Replacement of 21-iodine by 21-fluorine in 21-iodo-6β,16α - dialkylpregnane - 3β,5α,17α - triol - 20 - one 5-acylate or 3,5-diacylate (II)*

The reaction is carried out by heating a solution of the 21-iodo compound in a solvent of high-dielectric constant such as acetonitrile in the presence of silver fluoride. An excess of silver fluoride is normally employed, usually in the ratio of about 3 to 10 moles of silver fluoride per mole of 21-iodo steroid. The time of reflux may vary from 1–24 hours but we prefer to carry out the reaction for about one and one-half hours at the reflux temperature. At the end of this time, the excess silver fluoride and other insoluble solids are removed by filtration and the filtrate concentrated in vacuo to a small volume. Addition of ethyl acetate causes the precipitation of additional insoluble material which is removed by filtration. This final filtrate is then concentrated to dryness in vacuo to afford the crude 21-fluoro compounds (III) which are somewhat difficult to purify and are, therefore, normally used without purification. The presence of the desired functional groups is indicated by the characteristic infrared spectrum.

The 21-fluoro 3,5-diacylate may be converted to the corresponding 5-monoacylate by acid-catalyzed alcoholylsis, e.g. by treatment of a methanol solution thereof with a small amount of perchloric acid at room temperature over night. Dilution with water and filtration or extraction then affords the 3β-hydroxy-5-acylate.

*(3) Oxidation of 21-fluoro-6β,16α-dialkylpregnane-3β,5α, 17α-triol-20-one 5-acylate (III)*

The oxidation of the 3β-alcohol function of the 21-fluoro dialkyltriolone acylate to the 3-ketone function is normally carried out in acetone solution by treatment with aqueous chromium trioxide solution. The reaction is very rapid and is normally complete in two to four minutes. At the end of this time, the excess oxidizing agent is destroyed by adding aqueous sodium bisulfite solution. Other ketone solvents may be used providing they are water miscible and are not oxidized themselves. The oxidation may also be carried out with chromium trioxide in acetic acid or chromium trioxide in pyridine.

The product is recovered by dilution with saturated salt solution followed by extraction with ethyl acetate, methylene chloride or the like. The solvent extracts are washed free of inorganic materials and acids and then dried. Removal of the solvents in vacuo affords the crude 3-ketone product (IV) which may be purified by recrystallization or chromatography.

*(4) β-Elimination and epimerization of 21-fluoro-6β,16α-dialkylpregnane-5α,17α-diol-3,20-dione 5-acylate (IV)*

The 21-fluoro-6β,16α-dialkyldioldione acylate (IV) is converted to the 21-fluoro-6α,16α-dialkyl-4-pregnene-17α-ol-3,20-dione (V) by treatment with a strong acid in an alcoholic solvent. These conditions effect β-elimination of the 5α-acyloxy group together with one of the hydrogen atoms at carbon 4 to form the double bond between carbon atoms 4 and 5. The α,β-unsaturated ketone thus formed is a 21-fluoro-6β,16α-dialkyl-4-pregnene-17α-ol-3,20-dione. Under the same reaction conditions and by a process of enolization-ketonization, the hydrogen atom at carbon 6 is labilized. This permits the 6β-alkyl group to assume the thermodynamically more stable α-configuration with the hydrogen being in the β-configuration. Thus the reaction conditions effect β-elimination of the 5α-acyloxy group followed by epimerization of the 6-alkyl group from the β- to the α-configuration.

Normally the 5α-acyloxy-3-ketone compound (IV) is heated under reflux in ethanol containing a small amount of concentrated aqueous hydrochloric acid for a period of about one hour. Other strong acids may also be used such as p-toluenesulfonic acid, 2,4-dinitrobenzenesulfonic acid, and the like. Other alcoholic solvents may be used such as methanol or isopropanol. The exact times of reflux will depend upon the acid and the boiling point of the solvent used, generally varying inversely with both the strength of the acid and the boiling point of the solvent mixture.

The product, a 21-fluoro-6α,16α-dialkyl-4-pregnene-17α-ol-3,20-dione (V), is isolated by removal of about 70–80% of the alcoholic solvent in vacuo followed by dilution with water and extraction with ethyl acetate, methylene chloride or the like. The extracts are washed with water, saturated salt solution, dried and evaporated in vacuo to give the crude product (V) which may be purified by recrystallization or by chromatography on alumina or Florisil.

The β-elimination and epimerization may also be carried out under basic conditions, for example, with potassium hydroxide in aqueous ethanol. The conditions must, however, be very carefully controlled as to time, temperature, etc., in order to avoid concomitant homoannulation of the D-ring with its attached 17α-hydroxy-20-ketone system.

*(5) Acylation of 21-fluoro-6α,16α-dialkyl-17α-hydroxyprogesterones (V)*

The 17α-hydroxyl group of (V) may be acetylated to form the 21-fluoro-6α,16α-dialkyl-17α-acetoxyprogesterones by treatment with acetic anhydride and p-toluenesulfonic acid in glacial acetic acid solution. The reaction is normally carried out at room temperature for periods of 16–72 hours. Other acylating agents may be used such as propionic anhydride, caproic anhydride and the like. The acid solvent must correspond to the specific anhydride used. Also other acid catalysts such as 2,4-dinitrobenzenesulfonic acid may be used. The time of reaction at room temperature will vary within the 16–72 hour period depending upon the reagents and solvents used.

The product is isolated by pouring the reaction mixture into about ten volumes of water. The product is normally precipitated as a solid and can be removed by filtration. In some cases, the product is not crystalline and is separated by extraction with a solvent such as ethyl acetate, chloroform, methylene chloride and the like.

The crude filtered or extracted 17-ester is frequently contaminated with the corresponding $\Delta^{3,5}$-dienol-3,17-diacetate or other diacylate. The 17-monoacetate or other 17-acylate may be separated by chromatography. Normally, however, the crude 17-ester is treated with hydrochloric acid in methanol at room temperature for 2–4 hours. This treatment effects selective hydrolysis of the 3-acetate of the $\Delta^{3,5}$-dienol system, leaving the 17-ester intact; the $\Delta^{3,5}$-dienol system immediately rearranges to the original $\Delta^4$-3-ketone system.

The alcoholic solution is carefully concentrated to remove part of the alcoholic solvent, then diluted with water and the product isolated by filtration or extraction as above. The crude 21-fluoro-6α,16α-dialkyl-17-acyloxyprogesterone (VI) is then purified by crystallization from the conventional solvents or it may be purified by chromatography over neutral alumina or Florisil followed by crystallization.

The 21-fluoro-6,16α-dialkyl-$\Delta^6$-dehydro-17α-hydroxy progesterones (IX) and the corresponding $\Delta^{1,6}$-bisdehydro derivatives (VIII) described in section 6 below may also be acylated as described above to afford (XII) and (XI), respectively. Acylation of the $\Delta^1$-dehydro derivatives (VII) in the same manner affords the 17-acylates (X).

*(6) Chloranil dehydrogenation of 21-fluoro-6,16-dialkyl-17α-hydroxyprogesterones (V) and the corresponding esters (VI)*

The dehydrogenation of the 21-fluoro-6α,16α-dialkyl 17α-hydroxyprogesterones (V) to the corresponding $\Delta^6$-dehydro and $\Delta^{1,6}$-bisdehydro derivatives (IX and VIII, respectively) is accomplished by treatment with chloranil in a suitable solvent. Treatment in refluxing t-butanol produces the $\Delta^6$-dehydro derivatives and in refluxing secondary amyl alcohol the $\Delta^{1,6}$-bisdehydro derivatives. In addition, the $\Delta^6$-dehydro compounds (IX) are converted to the $\Delta^{1,6}$-bisdehydro compounds (VIII) by carrying out the reaction in refluxing secondary amyl alcohol.

The reaction is normally carried out in the refluxing alcoholic solvent in the presence of excess chloranil and a small quantity of glacial acetic acid for periods of about 16 hours. The reaction mixture is then cooled, diluted with a solvent such as methylene chloride and filtered. The filtrate is washed with water, aqueous sodium hydroxide solution, again with water and finally with saturated salt solution. Evaporation of the solvents in vacuo affords the crude dehydrogenated product which may be purified by crystallization from the usual solvents or by chromatography over neutral alumina. The $\Delta^6$-dehydro and $\Delta^{1,6}$-bisdehydro derivatives are identified by their characteristic infrared spectra.

The dehydrogenation of the 17-acylates of the 21-fluoro-6α,16α-dialkyl-17α-hydroxyprogesterones (VI) to the corresponding $\Delta^6$-dehydro and $\Delta^{1,6}$-bisdehydro derivatives (XII and XI, respectively) is achieved in the same manner as described above for the parent 17α-hydroxy compounds. The preparation of the $\Delta^{1,6}$-bisdehydro derivatives may again be carried out directly, i.e. (XI) from (VI), or stepwise, i.e. (VI) ⟶ (XII) ⟶ (XI).

The $\Delta^{1,6}$-bisdehydro derivatives (VIII and XI) are also obtained by chloranil dehydrogenation of the corresponding $\Delta^1$-dehydro compounds (VII and X), when one employs secondary amyl alcohol as the reaction solvent.

*(7) Introduction of the $\Delta^1$-double bond into 21-fluoro-6,16-dimethyl-17α-hydroxyprogesterones (V) and the corresponding esters (VI)*

The introduction of the $\Delta^1$-double bond into ring A of the steroid nucleus may be accomplished as described above by the use of chloranil in refluxing secondary amyl alcohol. Under these conditions the $\Delta^6$-double bond is normally introduced prior to the dehydrogenation at the one and two carbon atoms. The $\Delta^1$-double bond may be introduced selectively, however, by the dehydrogenating action of selenium dioxide, by fermentation with certain species of microorganisms, or by treatment with 2,3-dichloro-5,6-dicyanobenzoquinone.

Treatment of either a 21-fluoro-6α,16α-dialkyl-17α-hydroxyprogesterone (V) or its 17-acylates (VI) with selenium dioxide in t-butyl alcohol containing a small amount of glacial acetic acid affords the corresponding $\Delta^1$-dehydro derivatives (VII and X respectively). This same transformation may be accomplished by the action of certain species of microorganisms, e.g. *Bacillus sphaericus* (A.T.C.C. No. 7055) or *Corynebacterium simplex* (A.T.C.C. No. 6946).

The preferred procedure, however, involves the use of 2,3-dichloro-5,6-dicyanobenzoquinone (DDQ) in boiling dioxane or benzene. About 1.1–2.0 moles of DDQ are normally employed per mole of steroid. In benzene, the reaction is normally conducted under reflux for a period of about 5 hours. At the end of this time, the hydroquinone which has formed is present largely as an insoluble solid in suspension. The mixture is diluted with methylene chloride, filtered to remove the insoluble hydroquinone, and then extracted several times with 5% aqueous sodium hydroxide to remove the remainder of the hydroquinone and the unreacted DDQ. After washing the solvent layer with water, the solvents are removed in vacuo to give the crude $\Delta^1$-dehydro compound. The pure material is obtained by crystallization from the usual solvents or by chromatography over neutralized alumina.

The above process utilizing DDQ for the introduction of the $\Delta^1$-double bond may also be applied to the $\Delta^6$-dehydro compounds (IX and XII). Under the conditions described above, the $\Delta^6$-dehydro derivatives are converted to the corresponding $\Delta^{1,6}$-bisdehydro derivatives (VIII) and (XI), respectively.

EXAMPLE 1

*21-halogenation of 6β,16α-dimethylpregnane-3β,5α,17α-triol-20-one 5-acetate (I)*

To a solution of 3.0 g. of 6β,16α-dimethylpregnane-3β,5α,17α-triol-20-one 5-acetate in 15 ml. of tetrahydrofuran and 15 ml. of methanol was added 4.5 g. of calcium oxide and 150 mg. of azobisisobutyronitrile. The stirred mixture was illuminated with a 60 watt tungsten bulb and then a few drops of a solution of 3.0 g. of iodine in 15 ml. of tetrahydrofuran and 9 ml. of methanol was added. After 25 minutes' uptake of iodine began and the remainder of the iodine solution was added in one hour. The mixture was stirred for an additional hour, then diluted with ether and filtered. The filtrate was washed once with 15% aqueous sodium iodide solution and then with saturated salt solution, dried and evaporated in vacuo below 30° to an oil. This oil consisted of substantially pure 21-iodo-6β,16α-dimethyl-pregnane-3β,5α,17α-triol-20-one 5-acetate (II), $\lambda_{max.}^{CCl_4}$ 5.75, 5.80 and 8.10μ

EXAMPLE 2

*21-halogenation of 6β,16α-dimethylpregnane-3β,5α,17α-triol-20-one 3,5-diacetate (I)*

To a solution of 0.464 g. of 6β,16α-dimethylpregnane-3β,5α,17α-triol-20-one 3,5-diacetate in 3.4 ml. of tetrahydrofuran and 2.7 ml. of methanol was added 1.03 g. of calcium oxide and 30 mg. of azobisisobutyronitrile. The stirred mixture was illuminated with a 60 watt tungsten bulb and then a few drops of a solution of 0.525 g. of iodine in 2.7 ml. of tetrahydrofuran and 1.7 ml. of methanol was added. After 17 minutes, uptake of iodine began and the remainder of the iodine solution was added dropwise in 23 minutes additional. The mixture was stirred for an additional 45 minutes, filtered and the filtrate treated with 20 ml. of 5% aqueous sodium thiosulfate solution. The mixture was extracted several times with ethyl acetate. The combined extracts were washed several times with saturated salt solution, dried and evaporated to dryness in vacuo at room temperature to give an amorphous solid, 0.527 g., $\lambda_{max.}^{CCl_4}$ 2.79, 2.86, 5.75, 5.80, 8.10μ

The infrared spectrum of this product was identical to that of the product (II) in Example 1 above.

EXAMPLE 3

*Replacement of 21-iodo with 21-fluoro in 21-iodo-6β,16α-dimethylpregnane-3β,5α,17α-triol-20-one 5-acetate (II)*

A 1.24 g. sample of the 21-iodo compound from Example 1 was dissolved in 100 ml. of acetonitrile and 2.0 g. of silver fluoride added. The mixture was heated under reflux for 2 hours, then cooled to room temperature and filtered. The filtrate was concentrated in vacuo, the residue treated with ethyl acetate and the solution filtered again. This filtrate was concentrated to dryness in vacuo to give 21 - fluoro - 6β,16α,dimethylpregnane-3β,5α,17α-triol-20-one 5-acetate (III), $\lambda_{max.}^{CCl_4}$ 5.80, 5.87, 7.96μ

EXAMPLE 4

*Oxidation of 21-fluoro-6β,16α-dimethylpregnane-3β,5α,17α-triol-20-one 5-acetate (III)*

The crude 21-fluoro compound from Example 2 was dissolved in 50 ml. of acetone. To this solution was added with vigorous stirring 1.0 ml. of an 8 N chromic acid solution prepared as follows: 5.34 g. of chromium trioxide was dissolved in a mixture of 20 ml. of water and 4 ml. of concentrated sulfuric acid. The chromic acid solution was added in 35 seconds and after 3 minutes total time, a solution of sodium bisulfite was added and the total mixture poured into saturated salt solution. The organic material was extracted with several portions of ethyl acetate, the combined extracts washed with saturated salt solution, dried and evaporated in vacuo to an amorphous residue. A benzene-Skellysolve B (1:1) solution of this residue was introduced onto a column of neutral alumina. The fractions eluted with benzene and 9:1 benzene-ether were combined and crystallized from ether-methylene chloride followed by ether-Skellysolve B to afford the 21-fluoro-6β,16α-dimethylpregnane-5α,17α-diol-3,20-dione 5-acetate (IV), M.P. 147–150°, $\lambda_{max.}^{KBr}$ 2.88, 5.79, 5.85, 7.90, 8.02, 8.19μ

EXAMPLE 5

*β-Elimination and epimerization of 21-fluoro-6β,16α-dimethylpregnane-5α,17α-diol-3,20-dione 5-acetate (IV)*

An 8.74 g. sample of 21-fluoro-6β,16α-dimethylpregnane-3β,5α,17α-triol-20-one 5-acetate (III) prepared as in Example 2 was oxidized as in Example 3 to give 8.42 g. of crude amorphous dioldione (IV). A solution of this material in 400 ml. of absolute ethanol was treated with 2.0 ml. of concentrated hydrochloric acid and the mixture heated under reflux for one hour. At the end of this time, the mixture was cooled, partially concentrated in vacuo to about one-fifth the original volume and then diluted with 500 ml. of water. The organic material was extracted with ethyl acetate, the combined extracts washed with water and saturated salt solution and dried. Removal of the solvents in vacuo gave an amorphous residue weighing 6.81 g. A solution of this material in benzene-Skellysolve B (1:1) was placed on a Florisil column. The material eluted with 9:1 and 3:1 benzene-ether mixtures was combined and crystallized from ether-Skellysolve B to give 3.04 g. of 21-fluoro-6α,16α-dimethyl-17α-hydroxyprogesterone (V), M.P. 197–205°. A sample purified by several recrystallizations from ether had M.P. 202–208.5°, $[\alpha]_D$ +89.8° (chloroform), $\lambda_{max.}^{CHCl_3}$ 5.77, 5.82, 6.00, 6.21μ, $\lambda_{max.}^{EtOH}$ 242 mμ, ε 15,750

EXAMPLE 6

*Acetylation of 21-fluoro-6α,16α-dimethyl-17α-hydroxyprogesterone (V)*

A solution of 1.51 g. of 21-fluoro-6α,16α-dimethyl-17α-hydroxyprogesterone in 40 ml. of glacial acetic acid and 40 ml. of acetic anhydride was placed under a nitrogen atmosphere. To this solution was added quickly with stirring a solution of 1.2 g. of p-toluenesulfonic acid monohydrate in 40 ml. of glacial acetic acid. The mixture was stirred at room temperature for 18 hours and then poured into one liter of ice water. The precipitated material was extracted with several portions of ethyl acetate and the combined extracts washed twice with water, once with 5% aqueous sodium bicarbonate, and finally with saturated salt solution. The washed extracts were dried and evaporated to dryness in vacuo to give a semisolid product.

The crude residue was dissolved in 100 ml. of methanol and treated with 1.5 ml. of concentrated hydrochloric acid. After two and one-half hours at room temperature, the mixture was diluted with 600 ml. of water and the product extracted with several portions of ethyl acetate. The combined extracts were washed once with water, once with saturated salt solution, dried and evaporated in vacuo to an amorphous residue. A solution of this product in benzene-Skellysolve B (1:1) was placed on a column of Florisil. The material eluted with 1:1 benzene-Skellysolve B and with benzene was combined and crystallized twice from methylene chloride-Skellysolve B to give 21-fluoro-6α,16α-dimethyl-17α - acetoxyprogesterone (VI), M.P. 189–194°, [α]$_D^{28}$ +50.9° (chloroform), $\lambda_{max.}^{KBr}$ 5.79, 6.06, 6.23, 7.91, 8.03, 11.50μ, $\lambda_{max.}^{EtOH}$ 241 mμ, ε 13,860

*Analysis.*—Calcd. for $C_{25}H_{35}O_4F$: C, 71.74; H, 8.43; F, 4.54. Found: C, 71.95, 71.70; H, 8.05, 8.21; F, 4.60.

EXAMPLE 7

*Chloranil dehydrogenation of 21-fluoro-6α,16α-dimethyl-17α-hydroxyprogesterone (V)*

A mixture of 0.45 g. of 21-fluoro-6α,16α-dimethyl-17α-hydroxyprogesterone and 1.4 g. of chloranil in 50 ml. of t-butanol and 0.5 ml. of glacial acetic acid was heated under reflux for 22.5 hours. After cooling, the mixture was filtered and evaporated to near-dryness in vacuo. The residue was taken up in ethyl acetate and the extracts washed once with water, twice with 5% aqueous sodium hydroxide solution, twice with water and once with saturated salt solution. After drying, the solvents were removed in vacuo to give a solid which was recrystallized from Skellysolve B to afford 21-fluoro-6,16α-dimethyl-17α-hydroxy-Δ⁶-dehydroprogesterone (IX), M.P. 211–222°. Several recrystallizations from Skellysolve B raised the melting point to 213.5–224°, [α]$_D^{27}$ +67.8° (chloroform), $\lambda_{max.}^{KBr}$ 2.88, 5.76, 6.05, 6.15, and 6.32μ, $\lambda_{max.}^{EtOH}$ 290 mμ, ε 23,600

*Analysis.*—Calcd. for $C_{23}H_{31}O_3F$: C, 73.77; H, 8.34; F, 5.07. Found: C, 74.14, 74.06; H, 8.27, 8.34; F, 4.76, 4.83.

EXAMPLE 8

*Acetylation of 21-fluoro-6,16α-dimethyl-17α-hydroxy-Δ⁶-dehydroprogesterone (IX)*

To a solution of 208 mg. of 21-fluoro-6,16α-dimethyl-17α-hydroxy-Δ⁶-dehydroprogesterone in 20 ml. of glacial acetic acid and 10 ml. of acetic anhydride was added 0.2 g. of p-toluenesulfonic acid monohydrates. The mixture was stirred for 48 hours at room temperature and then poured into 250 ml. of ice water. The oil which separated was extracted with several portions of ethyl acetate and the combined extracts washed once with water, once with 5% aqueous sodium bicarbonate solution, once with saturated salt solution, dried and evaporated in vacuo to a foam. This residue was taken up in 20 ml. of methanol and 0.2 ml. of concentrated hydrochloric acid added. After standing for three and one-half hours at room temperature, 200 ml. of water was added and the mixture extracted several times with ethyl acetate. The combined extracts were washed once with saturated salt solution, dried and evaporated to dryness in vacuo. A benzene solution of this product was diluted with Skellysolve B and placed on a column containing Florisil. The material eluted with benzene was combined and crystallized from Skellysolve B to give 21-fluoro-6,16α-dimethyl-17α-acetoxy-Δ⁶ - dehydroprogesterone (XII), M.P. 207–217°, [α]$_D^{27}$ +16.0° (chloroform), $\lambda_{max.}^{EtOH}$ 290 mμ, ε 23,000, $\lambda_{max.}^{KBr}$ 5.78, 6.01, 6.16, 6.33, 7.91, 8.03, 11.30μ

*Analysis.*—Calcd. for $C_{25}H_{33}O_4F$: C, 72.09; H, 7.99; F, 4.56. Found: C, 72.17; H, 8.14; F, 4.40.

In a similar manner, the following dialkyl compounds corresponding to Formula V are also provided:

21-fluoro-6α,16α-diethyl-17α-hydroxyprogesterone
21-fluoro-6α,16α-dibutyl-17α-hydroxyprogesterone
21-fluoro-6α,16α-dioctyl-17α-hydroxyprogesterone By use of the desired acylating agent, the following 17-acylates corresponding to Formula VI are provided:

21-fluoro-6α,16α-dimethyl-17α-hydroxyprogesterone 17-caproate
21-fluoro-6α,16α-dimethyl-17α-hydroxyprogesterone 17-p-dodecoxyphenylpropionate
21-fluoro-6α,16α-diethyl-17α-hydroxyprogesterone 17-p-propoxyphenylpropionate
21-fluoro-6α,16α-diethyl-17α-hydroxyprogesterone 17-phenylpropionate
21-fluoro-6α,16α-dibutyl-17α-hydroxyprogesterone 17-cyclopentylpropionate
21-fluoro-6α,16α-dioctyl-17α-hydroxyprogesterone 17-caproate By employing the chloranil and/or selenium dioxide or 2,3-dichloro-5,6 - dicyanobenzoquinone dehydrogenation the corresponding Δ¹, Δ¹,⁶ and Δ⁶-dehydro derivatives of the following are provided:

21-fluoro-6,16α-diethyl-Δ⁶-dehydro-17α-hydroxyprogesterone
21-fluoro-6α,16α-dioctyl-Δ¹-dehydro-17α-hydroxyprogesterone
21-fluoro-6,16α-dimethyl-Δ¹,⁶-bisdehydro-17α-hydroxyprogesterone
21-fluoro-6,16α-dimethyl-Δ¹,⁶-bisdehydro-17α-hydroxyprogesterone 17-p-hexoxyphenylpropionate
21-fluoro-6α,16α-dioctyl-Δ¹-dehydro-17α-hydroxyprogesterone 17-caproate
21-fluoro-6,16α-dibutyl-Δ⁶-dehydro-17α-hydroxyprogesterone 17-cyclopentylpropionate
21-fluoro-6,16α-diethyl-Δ¹,⁶-bisdehydro-17α-hydroxyprogesterone 17-phenylpropionate
21-fluoro-6,16α-dimethyl-Δ¹,⁶-bisdehydro-17α-hydroxyprogesterone 17-acetate It is to be understood that the invention is not to be limited to the exact details of operation or the exact compounds shown and described, as obvious modifications and equivalents will be apparent to those skilled in the art and the invention is to be limited only by the scope of the appended claims.

The embodiments of the invention in which an exclusive property or privilege is claimed are defined as follows:

1. A steroid compound having the formula

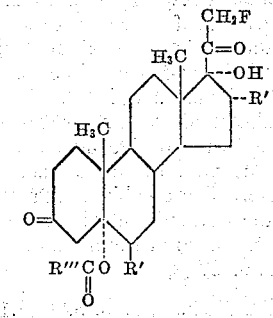

where R' is an alkyl group having from 1 to 8 carbon atoms and R''' is an alkyl group having from 1 to 12 carbon atoms.

2. A steroid compound as defined in claim 1 in which R' is methyl and R''' is methyl.

3. A steroid compound having the formula

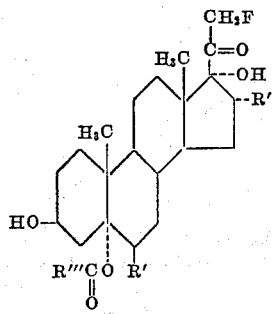

where R' is an alkyl group having from 1 to 8 carbon atoms and R''' is an alkyl group having from 1 to 12 carbon atoms.

4. A steroid compound as defined in claim 3 in which R' is methyl and R''' is methyl.

5. A steroid compound having the formula

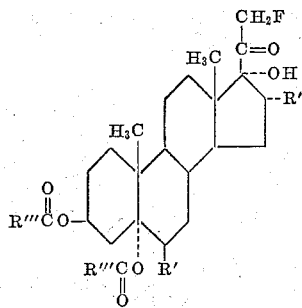

where R' is an alkyl group having from 1 to 8 carbon atoms and R''' is an alkyl group having from 1 to 12 carbon atoms.

6. A steroid compound as defined in claim 5 in which R' is methyl and R''' is methyl.

7. 21 - fluoro - 6β,16α - dimethylpregnane - 3β,5α,17α-triol-20-one 5-acetate.

8. 21 - fluoro - 6β,16α - dimethylpregnane - 5α,17α-diol-3,20-dione 5-acetate.

9. In a process of preparing steroid compounds having the formula:

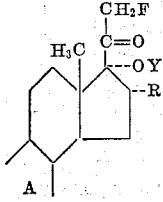

where A is selected from the group consisting of

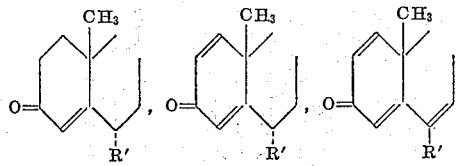

and

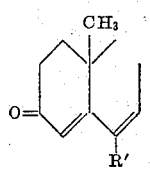

R' is an alkyl group having from 1 to 8 carbon atoms, Y is selected from the group consisting of H and

where R'' is selected from the group consisting of alkyl, cycloalkyl, aralkyl and alkoxyaralkyl groups in which the alkyl group has from 1 to 12 carbon atoms and the aryl group is phenyl, from a 21-iodo compound having the formula:

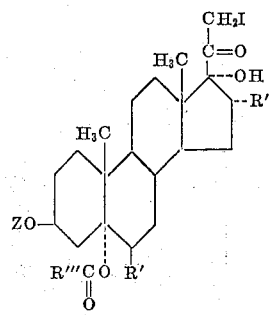

where R' is an alkyl group having from 1 to 8 carbon atoms, Z is selected from the group consisting of H and

and R''' is an alkyl group having from 1 to 12 carbon atoms, the sequence of steps comprising (a) treating said 21-iodo compound with silver fluoride thereby converting said 21-iodo compound to the corresponding 21-fluoro compounds selected from the group consisting of (X)

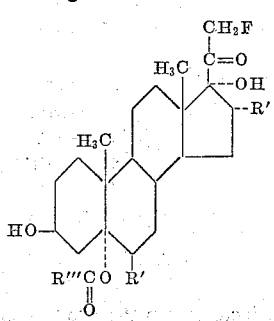

and (Y)

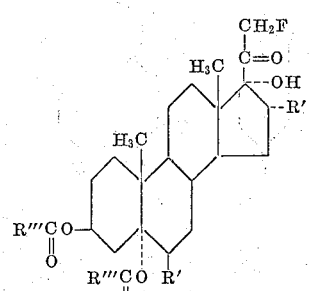

(b) treating said product (X) with chromium trioxide to provide the corresponding 3-ketone derivative;

(c) heating the product of (b) thereby providing

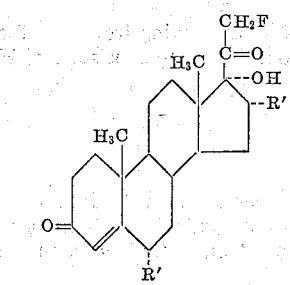

(d) treating the product of (c) with a dehydrogenating agent selected from the group consisting of chloranil, selenium dioxide, and 2,3-dichloro-5,6-dicyanobenzoquinone, thereby providing

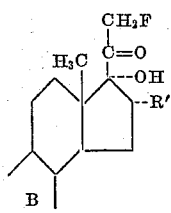

where B is selected from the group consisting of

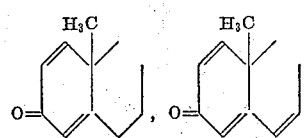

and

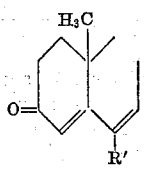

where R' and R'' are as previously defined.

10. In a process of preparing steroid compounds having the formula:

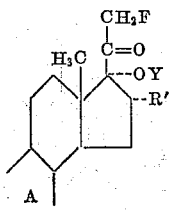

where A is selected from the group consisting of

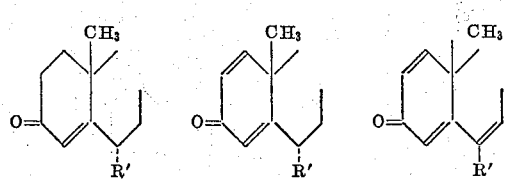

and

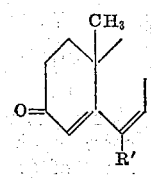

R' is an alkyl group having from 1 to 8 carbon atoms, Y is selected from the group consisting of H and

where R'' is selected from the group consisting of alkyl, cycloalkyl, aralkyl and alkoxyaralkyl groups in which the alkyl group has from 1 to 12 carbon atoms and the aryl group is phenyl, from a 21-iodo compound having the formula:

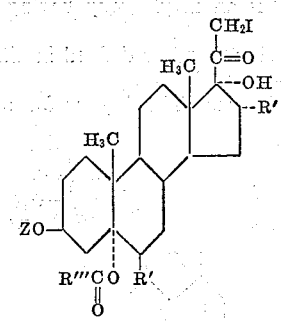

where R' is an alkyl group having from 1 to 8 carbon atoms, Z is selected from the group consisting of H and

and R''' is an alkyl group having from 1 to 12 carbon atoms, the sequence of steps comprising
  (a) treating said 21-iodo compound with silver fluoride thereby converting said 21-iodo compound to the corresponding 21-fluoro compounds selected from the group consisting of
  (X)

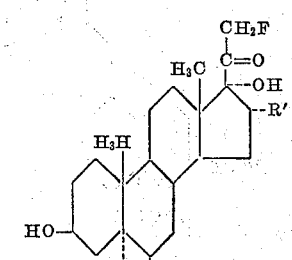

and
  (Y)

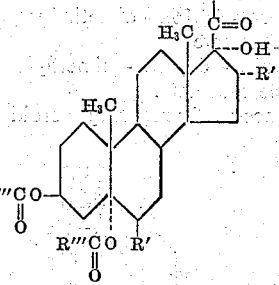

(b) treating said product (X) with chromium trioxide to provide the corresponding 3-ketone derivative;
(c) heating the product of (b) thereby providing

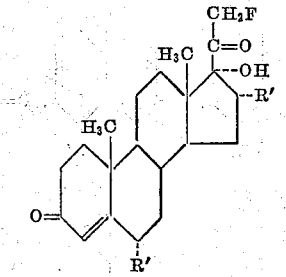

(d) treating the product of (c) with a dehydrogenating agent selected from the group consisting of Bacillus

*sphaericus* and *Corynebacterium simplex* thereby providing
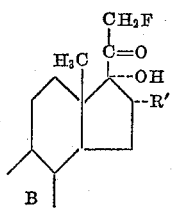
where B is selected from the group consisting of
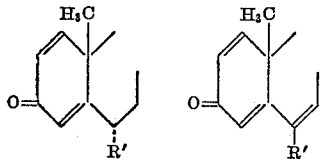
and
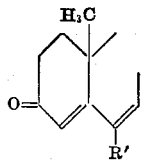
where R' and R" are as previously defined.
References Cited in the file of this patent
UNITED STATES PATENTS
2,894,008 Sollman _____ July 7, 1959
2,954,386 Beyler _____ Sept. 27, 1960
OTHER REFERENCES
Iriarte et al.: "Journal of Organic Chemistry," 1961, vol. 26, pages 2047–2053 relied on.